No. 609,890. Patented Aug. 30, 1898.
H. F. LOOS.
LOCKING LINK FOR CHAINS.
(Application filed Apr. 1, 1898.)
(No Model.)
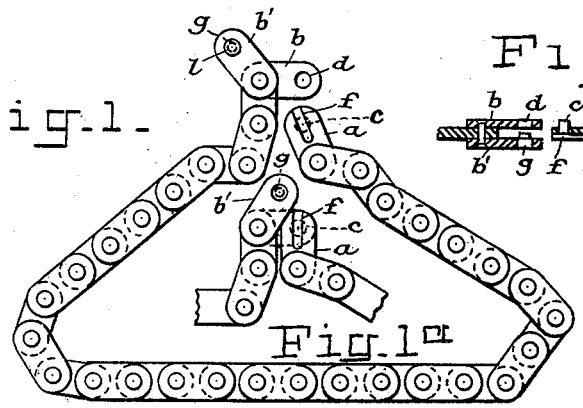
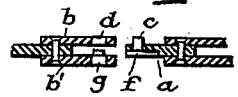
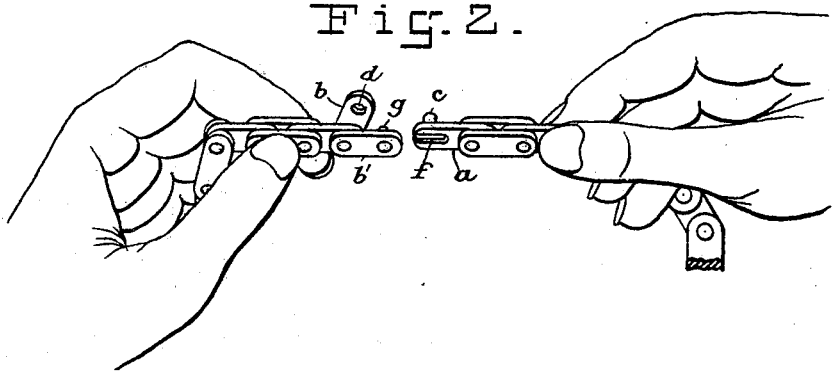
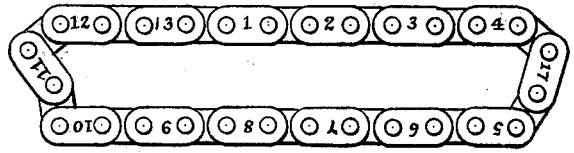
WITNESSES:
INVENTOR
Heinrich Friedrich Loos
BY
ATTORNEYS

UNITED STATES PATENT OFFICE.

HEINRICH FRIEDRICH LOOS, OF NUREMBERG, GERMANY.

LOCKING-LINK FOR CHAINS.

SPECIFICATION forming part of Letters Patent No. 609,890, dated August 30, 1898.

Application filed April 1, 1898. Serial No. 676,139. (No model.)

*To all whom it may concern:*

Be it known that I, HEINRICH FRIEDRICH LOOS, a subject of the King of Bavaria, residing at Nuremberg, Bavaria, in the German Empire, have invented a new and Improved Locking-Link for Chains for Locking Bicycles and the Like, of which the following is a specification.

This invention has for its object a chain capable of being closed, which is more particularly designed for securing cycle-wheels as a means of protection against thieves. The especial novelty consists in the means for fastening the ends of this chain together when closed in such a way that the place of juncture is not observable, so that the fastening can only be undone by an initiated person—that is to say, the owner of the cycle.

The invention is illustrated in the accompanying drawings, in which—

Figure 1 is a side elevation of the chain, showing the ends disconnected. Fig. 1ª is a similar view illustrating the method of making the connection. Fig. 2 is a perspective view of the adjoining ends before connection. Fig. 2ª is an edge view thereof, and Fig. 3 is a side elevation of the chain with the ends connected.

The chain is an endless one composed of flat links which are flexibly connected with one another by means of rivets. One end of the chain is formed of two side links $b$ $b'$ and the other end by a central link $a$, adapted to fit between the other two side links. This central link is provided with a short pin $c$, while one of the side links is formed with a hole $d$, into which the said pin or stud is inserted with the object of closing the chain. The other side link has on its outer side a projection having the form of a rivet-head, and after the pin of the central link has been engaged in the hole in the one side link the said other side link is folded down into the plane of the other links. As therefore on one side of the point of connection there only appears the upper end of the pin, which resembles a rivet-head, and on the other side of the connection a blind rivet end, the point of connection differs in no way in appearance from the other links and is therefore not apparent to the non-initiated. In order to make it recognizable by the proprietor without difficulty, any suitable inconspicuous mark may be attached, or the various links may be numbered, so that the proprietor only needs to remember the number on the link.

In order that the fastening may not be discovered and unfastened by an unauthorized person by testing each separate link, the following arrangement is adopted: The central link is formed with a narrow groove or recess $f$, and one of the side links at the other end of the chain is provided on its inner side with a short pin or stud $g$, adapted to fit into said groove, but only at a certain given mutual position of the two links. It is therefore necessary to know the arrangement and mode of working of this fastener before the end links can be fastened together or separated.

The method of making the connection is as follows: The parts being in the position shown in Fig. 1, the pin or projection $c$ is inserted in the opening $d$, and the link $a$ is then turned to bring the slot or groove $f$ in line with pin $g$, as shown in Fig. 1ª, when the link $b'$ may then be folded down parallel with link $b$, thus holding link $a$ securely between the two links. The parts can thus only be disconnected by a reversal of the process—*i. e.*, bringing link $a$ into such a position that its groove or recess $f$ will permit the disengagement of pin $g$ and the moving of link $b'$ into the position shown in Fig. 1ª.

I claim—

A link-chain having two links at one end and one at the other, a pin projecting from said single link adapted to enter an opening in one of the two links and a pin projecting from the other of the two links adapted to enter a groove or recess in the single link, substantially as described.

In witness whereof I have hereunto set my hand in presence of two witnesses.

HEINRICH FRIEDRICH LOOS.

Witnesses:
 LORENZ PURNER,
 ANDREAS STICY.